(12) United States Patent
Reisner

(10) Patent No.: US 12,202,537 B2
(45) Date of Patent: Jan. 21, 2025

(54) ADJUSTMENT UNIT AND ADJUSTMENT DEVICE FOR ADJUSTING A RELATIVE POSITION OF COMPONENTS SUPPORTED AGAINST ONE ANOTHER

(71) Applicant: AUDI AG, Ingolstadt (DE)

(72) Inventor: Maximilian Reisner, Weichering (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/253,307

(22) PCT Filed: Nov. 24, 2021

(86) PCT No.: PCT/EP2021/082824
§ 371 (c)(1),
(2) Date: May 17, 2023

(87) PCT Pub. No.: WO2022/152441
PCT Pub. Date: Jul. 21, 2022

(65) Prior Publication Data
US 2024/0010278 A1  Jan. 11, 2024

(30) Foreign Application Priority Data
Jan. 13, 2021 (DE) .......................... 102021100455.1

(51) Int. Cl.
*B62D 17/00* (2006.01)
(52) U.S. Cl.
CPC ...... *B62D 17/00* (2013.01); *B60G 2200/4622* (2013.01); *B60G 2200/464* (2013.01)

(58) Field of Classification Search
CPC .... B62D 17/00; B60G 7/02; B60G 2200/142; B60G 2200/144; B60G 2200/46; B60G 2200/4622; B60G 2200/464; B60G 2204/143; B60G 2204/41; B60G 2204/42; B60G 2204/44; B60G 2204/4402; B60G 2204/61
See application file for complete search history.

(56) References Cited

U.S. PATENT DOCUMENTS

| | | | | |
|---|---|---|---|---|
| 4,530,512 A * | 7/1985 | Evlanov | ............... | B60G 13/006 280/86.753 |
| 5,052,711 A * | 10/1991 | Pirkey | .................... | B62D 17/00 280/86.753 |
| 6,302,416 B1 * | 10/2001 | Schmack | ............... | B60G 15/07 280/86.754 |
| 6,688,616 B1 * | 2/2004 | Ziech | ...................... | B60G 7/02 280/86.753 |

(Continued)

*Primary Examiner* — Toan C To
(74) *Attorney, Agent, or Firm* — Maier & Maier, PLLC

(57) ABSTRACT

An adjustment unit including a bearing having an inner core formed with a passage extending in the longitudinal direction of the inner core. A spacing element is arranged in the passage, which spacing element has an opening for receiving a bearing pin, the opening extends along a longitudinal axis which defines the attachment axis of the bearing, and the attachment axis and the bearing axis are adjustable relative to one another by adjusting the spacing element. The spacing element is movably arranged in the direction of extension of the passage. When the bearing is installed, the spacing element is axially adjusted along the attachment axis and causes a translational deflection of the inner core transversely to the attachment axis.

16 Claims, 4 Drawing Sheets

(56) References Cited

U.S. PATENT DOCUMENTS

| | | | |
|---|---|---|---|
| 7,111,855 B2 * | 9/2006 | Winkler | B62D 17/00 |
| | | | 280/86.754 |
| 8,746,714 B2 * | 6/2014 | Frens | B62D 17/00 |
| | | | 280/86.753 |
| 9,186,945 B2 * | 11/2015 | Luttinen | B60G 3/04 |
| 10,899,186 B2 * | 1/2021 | Mleczko | B60G 7/008 |
| 2012/0269596 A1 * | 10/2012 | Frens | B60G 3/06 |
| | | | 411/378 |
| 2019/0054785 A1 * | 2/2019 | Keuser | F16C 27/063 |

* cited by examiner

ADJUSTMENT UNIT AND ADJUSTMENT DEVICE FOR ADJUSTING A RELATIVE POSITION OF COMPONENTS SUPPORTED AGAINST ONE ANOTHER

FIELD

The invention relates to an adjustment unit as well as to an adjustment device for adjusting a relative position of components supported against one another.

BACKGROUND

The chassis of a vehicle is a complex composite of components that connect the vehicle body to the roadway via the wheels. A vehicle wheel is usually connected to the vehicle body via several control arms, in such a way that relative movement between the vehicle body and the wheel is possible. The control arms are usually connected on the wheel side via a respective bearing. On the vehicle body side, the control arms can be connected via a bearing to the body, a component connected to the body or a steering gear. In particular, the control arms provide a connection allowing a correct wheel alignment in relation to the vehicle body, in order to ensure safe and comfortable vehicle behavior. In particular, by adjusting the bearing position on the vehicle body side in the transverse direction of the vehicle, it is possible, for example, to adjust the toe or camber through the suspension travel.

Adjustment devices for toe or camber adjustment for chassis or wheel suspensions of motor vehicles are known. With regard to the state of the art, reference is made to DE 41 15 111 C2, DE 44 37 661 A1, U.S. Pat. No. 5,398,411 A and EP 2 783 947 A1, from which adjustment devices are known in which a bearing of a control arm is fastened in a double shear bearing holder or between two supporting legs using a bearing pin and a nut, the bearing pin being supported in a slotted hole of the respective supporting leg. Guides are located on both sides of the slotted holes on the support legs, between which a spacing element, in particular an eccentric washer, is arranged. In order to adjust the control arm, the bearing pin can be displaced or adjusted by rotating within the slotted holes, after loosening a nut or the like, causing displacement of the bearing in the transverse direction of the vehicle, to generate a relative movement between a control arm and a portion of the body or a wheel carrier, for example.

EP 1 932 692 A1 discloses an articulated device for connecting a control arm to a vehicle body, which comprises a rubber-metal bearing which is passed through by a bearing pin, the longitudinal axis of which defines the articulation axis. The control arm is bolted to the vehicle body via two mounting portions, each having a slotted hole, and which are formed integrally with the bearing pin. The mounting portions extend in a plane inclined at a predetermined angle to the joint axis. A spacing element designed as a cam element is arranged at one of the slotted holes. The relative position of the control arm to the vehicle body can be adjusted by rotating the spacing element.

DE 10 2015 016 493 A1 discloses a bearing arrangement for a wheel suspension of a vehicle, in which a control arm is articulated about a pivot axis on a vehicle body, such as a subframe, by means of a rubber-metal bearing. The rubber-metal bearing is supported in a control arm bracket designed as a separate component, which is connected to the vehicle body by means of a connecting flange via screw connections of an adjustment unit. The bolts pass through slotted holes on the subframe side, the longitudinal extent of which defines an adjustment direction of the pivot axis, in particular for adjusting the camber behavior of the wheel suspension relative to the supporting structure on the body side.

DE 10 2014 201 876 A1 relates to an adjustment device for toe and/or camber adjustment of a wheel guide element which is connected via a respective bearing on the one hand to the vehicle body and on the other hand to a wheel carrier of a wheel of the motor vehicle. One of the respective bearings has an adjusting element designed as an eccentric, which is provided with an eccentric shaft which is adjustable by means of an actuator. The rotation of the eccentric shaft enables individual wheel adjustment.

DE 10 2014 226 536 A1 describes a control arm for a wheel suspension of a vehicle, which control arm is designed in two parts. The two control arm elements of the control arm are connected to one another via fastening elements as well as a length adjustment device. The length adjustment device is in the form of an eccentric screw which passes through a slotted hole in one of the control arm elements. A spacing element arranged on the slotted hole, for example an eccentric washer, is guided in a guide. When the eccentric screw is turned, the positive guide causes the screw shank to move in or against the longitudinal axis of the control arm and changes the relative position of the two control arm elements. The length of the control arm can thus be changed and is used to adjust the toe and/or camber.

WO 2016 041 706 A1 discloses a track rod or steering rod for a vehicle, which has a tube connected to a joint via an adjustment sleeve. The adjustment sleeve is screwed into the end of the tube in a first direction of rotation and screwed to a shank of the joint via an internal thread which is opposite to the first direction of rotation. Rotation of the adjustment sleeve relative to the tube and to the shank allows an axial adjustment movement of the tube relative to the joint. The adjustment sleeve has a meandering or sinusoidal slot extending in the axial direction. A clamp presses the tube end portion against the outer circumference of the shank with the adjustment sleeve interposed. As a result, the tube, the adjustment sleeve and the shaft are fixed in position relative to one another.

DE 10 2015 111 438 A1 describes a generic adjustment device. A spacer assembly adjustable via a spacing element, comprises a joint having a bush bearing embraced by two bearing brackets. The bush bearing is formed with a through bore concentric with the bearing axis. A spacing element formed as a cam is received in the through bore, and has a continuous cam bore the cam axis of which is eccentric to the bearing axis. A screw disposed in the cam bore penetrates the bearing brackets and engages the cam bore such that rotation of the screw about the first cam axis causes the cam in the bush to rotate about the bearing axis. In this manner, the bearing brackets move relative to the bearing axis, allowing the distance between the components of the component assembly to be adjusted.

The disadvantage of adjustment devices is that they are usually made up of a lot of components and are expensive constructions that are often integrated in complex welded structures, so that they have little flexibility. Furthermore, they are usually installed in regions that are difficult to access and provide small installation space, in which many different components are housed, thus complicating assembly.

SUMMARY

The object of the invention is to further develop an adjustment unit in such a way that the disadvantages of the previously known solutions are reduced.

Furthermore, the invention relates to an adjustment device for adjusting a distance between components supported against one another.

In a known manner, an adjustment unit comprises a bearing having an inner core extending along the bearing axis. In particular, the bearing may be in the form of a rubber-metal bearing. The inner core has a passage extending in the longitudinal direction of the inner core, which passage serves to receive a bearing pin, which may be designed, for example, as a screw with a partial thread.

An adjustable spacing element is arranged in the passage. The spacing element can be designed as a cam element, for example. The spacing element has an opening which is also designed to receive the bearing pin. When the bearing is installed, the bearing pin passes through the inner core and the spacing element. The spacing element extends along a longitudinal axis which defines a attachment axis of the bearing and which extends parallel to the bearing axis.

By adjusting the spacing element, the attachment axis and the bearing axis can be adjusted relative to one another. Thus, for example, a rotation of the bearing pin about the respective longitudinal axis causes the attachment axis to be adjusted relative to the bearing axis or the attachment axis to rotate about the bearing axis. This causes an adjustment of the bearing position. In this way, for example, a bearing used to connect a control arm to a subframe can be adjusted, in particular in the transverse direction of the vehicle, in order to adjust the toe and/or camber.

According to the invention, the spacing element is arranged movably in the extension direction of the passage, wherein, in the installed state of the bearing, the spacing element is axially and linearly displaced along the attachment axis and causes a deflection of the inner core transverse to the attachment axis. The inner core of the bearing extends coaxially with respect to the bearing axis, which is disposed substantially in a plane parallel to the attachment axis. The spacing element is linearly movable within the passage of the inner core along the longitudinal axis of the passage. At the same time, the linear movement of the spacing element occurs along the attachment axis when the adjustment unit is installed. The linear movement of the spacing element causes a translational deflection of the inner core transverse to the attachment axis. In other words, the linear movement of the spacing element causes a translational displacement of the bearing axis and thus of the entire bearing within the plane. The translational displacement of the inner core allows the entire bearing to be displaced over an adjustment travel extending transverse to the attachment axis.

The adjustment unit can be used, for example, as a bearing for connecting components. Consequently, a relative position of these components can be varied via the adjustment unit. For example, the adjustment unit can be used to compensate for production-related tolerances of components supported against one another or to adjust wheel position parameters.

The adjustment unit advantageously requires a small installation space, which corresponds to the installation space required by a conventional bearing.

Furthermore, the adjustment unit can be retrofitted into joints. For example, a conventional rubber-metal bearing pressed into a joint can be replaced by the adjustment unit. The adjustment unit can be marketed, for example, as additional equipment or as a chassis tuning kit.

According to a preferred embodiment, the spacing element is arranged in the inner core in a non-rotatable manner. The spacing element is arranged in the passage of the inner core and may have a smaller longitudinal extension than the passage. The passage and the spacing element may have a substantially complementary shape to one another, which prevents rotation of the spacing element relative to the inner core. For example, the passage and the spacing element each have a hexagonal shape, wherein the passage and the spacing element are precisely matched to one another. In this case, the spacing element can, for example, be formed as a standard hexagon nut and the inner core can be provided with a hexagonal opening by means of an extrusion process. Advantageously, the adjustment unit can be manufactured at low cost and with little effort.

It is also conceivable that the opening is formed as a substantially rectangular recess and that the spacing element has, for example, a cubic shape, the spacing element having two parallel cube edges which are arranged to fit precisely in the opening in order to prevent rotation of the spacing element relative to the opening. Furthermore, the spacing element is integrated in the inner core of the bearing in a space-saving manner and protected from dust and dirt.

According to a preferred embodiment, the passage of the inner core has a longitudinal axis that runs at an angle to the bearing axis. The passage of the inner core is geometrically designed to have an inclination relative to the bearing axis. That is, the respective axes of the passage and the bearing are arranged at an angle to one another, which may be, for example, 5° to 30°. In particular, the angle may be 8°.

The inner core of the bearing can, for example, have the above-mentioned hexagonal passage, which is designed such that its longitudinal axis runs at an angle to the bearing axis. The spacing element, which may have a smaller longitudinal extension than the passage, is linearly displaceable in the longitudinal direction within the passage. In the installed state, linear displacement of the spacing element takes place along the attachment axis, which is defined by the opening of the spacing element. The constrained guide of the spacing element on the one hand along the attachment axis and on the other hand within the passage, which extends at an angle to the bearing axis and to the attachment axis, has the effect that a displacement of the spacing element deflects the inner core of the bearing translationally, the direction of action being transverse to the attachment axis. In other words, the linear displacement of the spacing element causes a translational deflection of the inner core and thus of the entire bearing relative to the attachment axis.

According to an alternative embodiment, the spacing element is displaceable along at least one guide rail arranged on the inner core, the guide rail extending at an angle to the bearing axis in the longitudinal direction of the passage. In this embodiment, the passage can be formed in particular as a rectangular recess extending in the axial direction of the bearing. The passage may be arranged coaxially with the bearing axis. In the passage, a cube-shaped spacing element is arranged so as to be non-rotatable relative to the inner core, for example. A guide rail is arranged on the inner core, which rail is designed for guiding the spacing element, for example as a groove or the like. The guide rail can have a profile, for example.

The guide rail extends in the longitudinal direction of the passage at an angle to the bearing axis. The angle can be 8°, for example. The spacing element is adjustable along the guide rail in the longitudinal direction of the passage, wherein displacement of the spacing element along the guide rail with simultaneous positive guidance along the attachment axis causes translational deflection of the inner core of the bearing transverse to the attachment axis. In this way, the entire bearing is displaced transverse to the attachment axis.

Overall, the direction of action of the translational deflection of the inner core and thus of the bearing is transverse to the attachment axis. Advantageously, the direction of action can be flexibly adjusted by changing the orientation of the adjustment unit or the orientation of the bearing of the adjustment unit.

The geometry of the inner core can be flexibly adapted to the requirements of the adjustment unit or to the requirements of an articulated joint. Thus, the adjustment unit can be used particularly flexibly by changing the inner core, i.e. by selecting the geometry of the inner core accordingly.

Preferably, the spacing element has at least one guide element that is received in the guide rail. The guide element can, for example, be designed as a guide pin or the like. The guide rail and the guide element can, for example, be formed with complementary profiles. The guide element guides the linearly adjustable spacing element securely along the guide rail, the spacing element being displaceable along the guide rail like a supported carriage. The guide element displaces the bearing inner core translationally along the direction of action, i.e. transverse to the attachment axis.

Preferably, the spacing element is provided with an internal thread. The internal thread engages in particular with an external thread of the bearing pin, whereby the linear adjustment of the spacing element along the attachment axis is effected by screwing the spacing element on the bearing pin. The spacing element is formed with an internal thread, which in particular has the same dimension as an external thread of the bearing pin to be received. The internal thread can engage with the external thread in such a way that screwing the spacing element on the bearing pin causes a linear travel of the spacing element along the attachment axis or longitudinal axis of the bearing pin. The spacing element is at the same time positively guided along the bearing pin or along the attachment axis and in the passage, which extends at an angle to the attachment axis, whereby the spacing element displaces the inner core. This causes a translational deflection of the inner core or the bearing axis relative to the attachment axis.

Furthermore, the invention relates to an adjustment device for adjusting a relative position of two components supported against one another. The adjustment device comprises an adjustment unit which comprises a bearing in which a spacing element is arranged, which spacing element has an opening which defines an attachment axis of the bearing. The bearing is received in a bearing receptacle of the respective component. The bearing receptacle is embraced, in a manner known per se, by a bearing holder arranged on the other component, which is designed as a double shear attachment, for example with fork-like supporting legs, receiving legs, bearing brackets or the like.

The bearing is fixed in the bearing holder using a bearing pin and a nut. The bearing pin, which can be designed as a screw with a partial thread, for example, passes through the bearing, the spacing element and the bearing holder and can be fixed to the bearing holder by means of the s crew able nut.

According to the invention, the adjustment device has an adjustment unit as described above. The adjustment unit is provided with a bearing, the inner core of which has a passage in which the spacing element is arranged so as to be axially movable. In the installed state of the adjustment device, the linear adjustment of the spacing element along the attachment axis causes a translational deflection of the inner core transverse to the attachment axis, as a result of which a relative position of the components supported against one another can be adjusted.

The adjustment device advantageously allows a relative position between components supported against one another to be adjusted over ample adjustment travels, wherein the installation space required by the adjustment device remains the same compared to a conventional double shear bearing attachment. Compared with prior art adjustment devices, the present adjustment device requires little installation space and is advantageously easy to install in poorly accessible regions, where installation space is critical.

The adjustment device can be used at any bearing position that comprises a double shear joint or bearing attachment. For example, it can be used to attach a drive unit to the subframe.

In particular, the adjustment device can be used in the chassis at kinematic points that comprise a double shear joint or bearing attachment. For example, a control arm can be connected to a subframe via the adjustment device, wherein wheel position variables, such as the toe and/or camber angle, can be influenced and adjusted via the adjustment device.

Due to the differently adjustable orientation or alignment of the bearing, the adjustment device is advantageously independent of direction. For example, the adjustment device is suitable for providing different vehicle heights with identical wheel position variables and also identical variation gradients of the wheel position variables over the suspension travel.

The adjustment device can also be used to easily compensate for production-related tolerances of the components to be joined.

Furthermore, the adjustment device entails advantages in automated vehicle production. For example, in case of automated axle adjustment, a translational deflection of an automatic bolting machine is not required, thus reducing assembly time.

The adjustment device and the adjustment unit allow a high degree of flexibility in the development of a vehicle, for example, or the like. Thus, in the event of design changes to the components to be connected, for example, the direction of action of adjustment travel of the adjustment unit can be changed simply by changing the bearing alignment. Furthermore, only the inner core of the bearing of the adjustment unit needs to be changed, avoiding the need for changing an entire component, for example an entire subframe structure.

Preferably, the bearing pin is in operative connection with the inner core via the spacing element in order to deflect the inner core along an adjustment travel transverse to the attachment axis. An external thread of the bearing pin engages with an internal thread of the spacing element. Rotation of the bearing pin causes the spacing element to move along a linear path on the bearing pin. Rotation of the bearing pin causes the spacing element to move linearly along the bearing pin. The spacing element is guided in the passage of the inner core, wherein the passage has an inclination or angle relative to the attachment axis and the bearing pin. Due to the interaction of the constrained guidance of the spacing element both in the guide rail and along the bearing pin, the linear movement of the spacing element causes a translational movement of the inner core, wherein the direction of action is transverse to the bearing pin. This means that the bearing axis can be deflected along an adjustment travel transverse to the attachment axis, thus allowing an adjustment of a relative position of the components supported against one another via the adjustment device. The adjustment device has the advantage that an adjustment of the relative position of the components supported against one another is achieved solely by turning the bearing pin. In an advantageous manner, further, complex and sometimes expensive constructions, such as welded constructions on the bearing supports or subframe constructions, are not required. This reduces assembly and manufacturing costs.

Preferably, the adjustment travel is adjustable as a function of an axial travel distance of the spacing element. Due to the geometry of the guide rail, the adjustment travel of the inner core relative to the attachment axis has a direct relationship to the relative position of the spacing element along the attachment axis. Alternatively, the adjustment travel can be adjusted as a function of a number of rotations of the bearing pin. Depending on the number of rotations of the bearing pin, the spacing element can be displaced by a precise adjustment travel relative to the attachment axis. In this way, an approach of the adjustment travel to an end stop can be detected.

BRIEF DESCRIPTION OF THE FIGURES

Further advantages and possible applications of the present invention will be apparent from the following description in conjunction with the exemplary embodiment shown in the drawings.

In the drawings.

DETAILED DESCRIPTION

Figure 1:
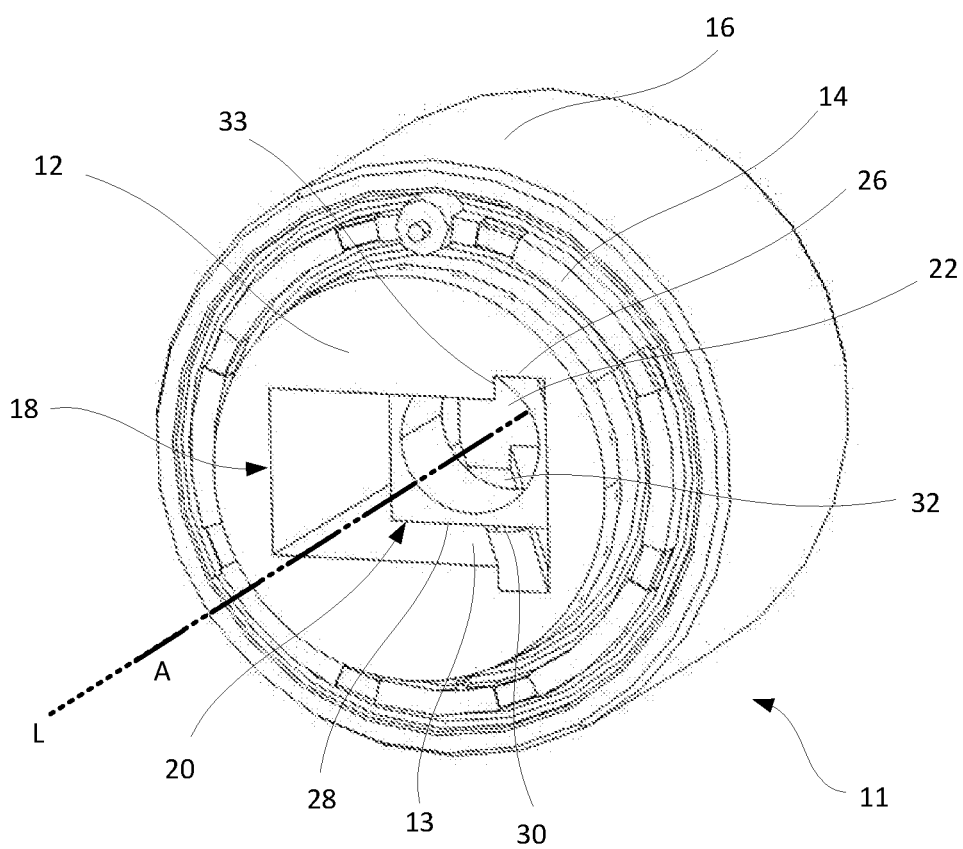
FIG. 1 shows an adjustment unit according to the invention.

FIG. 1 shows an adjustment unit according to the invention, which is designated as a whole by the reference numeral 10.

The adjustment unit 10 comprises a bearing 11, which is presently designed as a rubber-metal bearing 11. The bearing 11 comprises an inner core 12, which is connected to an outer sleeve 16 via an elastomer body 14. The inner core 12 of the bearing 11 is presently substantially cylindrical in shape and extends in the direction of the bearing axis L. The inner core 12 has a passage 18, which is presently formed as a substantially rectangular, continuous recess 18, which extends in the axial direction of the bearing 11.

A spacing element 20 is arranged in the passage 18, which spacing element comprises an opening 22 for receiving a bearing pin 24 presently not shown. The opening 22 is formed with an internal thread, which is also not shown. The opening 22 defines an attachment axis A of the bearing 11, which runs parallel to the bearing axis L. In the present case, the attachment axis A and the bearing axis L overlap. Presently, the spacing element 20 is of cube-shaped design and is arranged, by means of two parallel edges 26, 28 in a precisely fitting manner in the passage 18 of the inner core 12, in order to prevent the spacing element 20 from rotating relative to the inner core 12.

The spacing element 20 is linearly adjustable or movable in the direction of extension of the bearing 11 within the passage 18. In the present case, the spacing element 20 is guided in a guide rail 32 via a guide element 30, which is designed, for example, as a guide pin 30. The guide rail 32 is arranged on an inner wall 13 of the inner core 12, and can in particular be formed as a slot, indentation or groove of the inner wall 13. It is also possible that the guide rail 32 is formed, for example, as a rail-like separate component 32. The guide rail 32 extends at an angle to the bearing axis L in the longitudinal direction of the passage 18. This means that the guide rail 32 has an inclination relative to the bearing axis L.

Presently, the inner core 12 has a further guide rail 33 opposite the guide rail 32. The two guide rails 32, 33 are essentially identically constructed and are parallel to one another.

The spacing element 20 is linearly movable within the passage 18 along the longitudinal axis of the passage 18. In the installed state of the adjustment unit 10, the linear movement of the spacing element 20 forcedly occurs along the attachment axis A, causing a translational deflection of the inner core 12 and thus of the entire bearing 11 transversely to the attachment axis A.

It is also conceivable that the passage 18 has a hexagonal shape, for example, and extends in the longitudinal direction of the bearing 11 at an angle relative to the bearing axis L, the bearing axis L and the longitudinal axis of the passage 18 extending substantially in the same plane. In this alternative embodiment, the spacing element 20 has a hexagonal shape complementary to the passage 18. The spacing element 20 is linearly movable in the passage 18, wherein the longitudinal axis of the passage 18 has an inclination or angle with respect to the bearing axis L. Due to the positive guidance of the spacing element 20 along the attachment axis A, the spacing element displaces the inner core 12 of the bearing 11 in a translational manner, wherein the direction of action of the displacement extends transversely to the attachment axis A.

Figure 2:
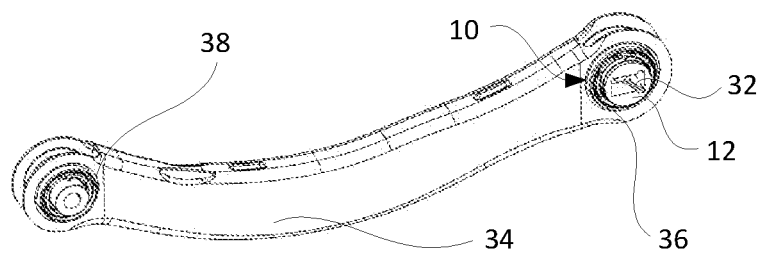
FIG. 2 shows an adjustment unit according to the invention arranged in a bearing receptacle of a control arm.

FIG. 2 shows a wishbone 34 of a vehicle, which is formed at each of its ends with a first bearing receptacle 36 and a second bearing receptacle 38. An adjustment unit 10 as shown in FIG. 1 is arranged in the first bearing receptacle 36, via which the wishbone 34 can be connected, for example, to a subframe 40, which is presently not shown. The adjustment unit 10 comprises a guide rail 32 which is aligned in such a way that the direction of action of displacement of the inner core 12 extends along the longitudinal axis of the control arm. In the installed state of the control arm 34, a 90° rotated arrangement of the bearing enables, for example, the adjustment of wheel position gradients, such as the toe and/or camber angle variation over a suspension travel.

Figure 3:
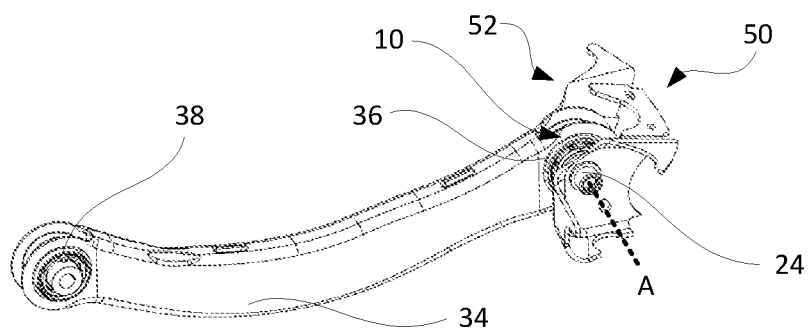
FIG. 3 shows a control arm on which an adjustment device according to the invention is arranged.

FIG. 3 shows a wishbone 34 according to FIG. 1, wherein an adjustment device according to the invention is arranged on the wishbone 34, which adjustment device is designated in its entirety by the reference numeral 50. The adjustment device 50 comprises an adjustment unit 10, which in the present case is received in the first bearing receptacle 36 of the wishbone 34 and is fixed via a bearing pin 24 to a double shear bearing holder 52. The adjustment unit 10 is concealed behind the bearing holder 52 in a space-saving manner and advantageously has the same installation space requirement as a conventional rubber-metal bearing 11, via which a control arm 42 can be connected to a subframe 40.

Figure 4:
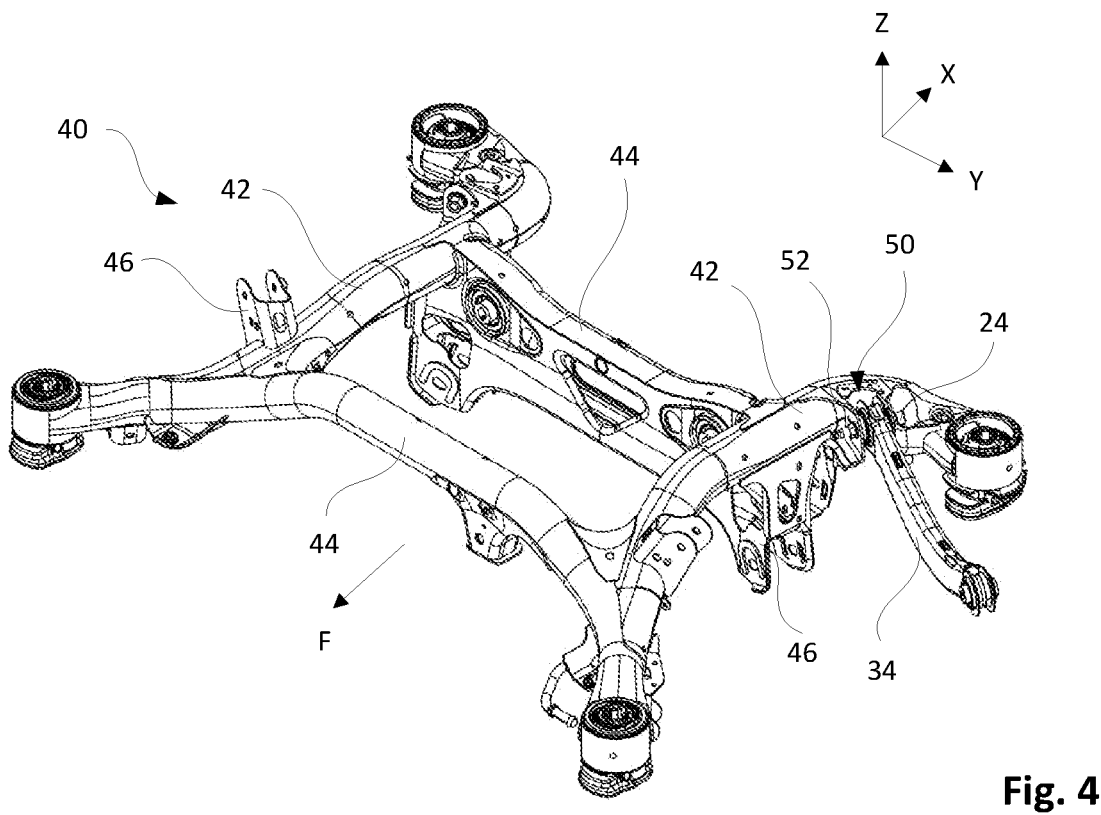
FIG. 4 shows a subframe and a control arm, which are supported against one another via an adjustment device according to the invention.

FIG. 4 shows the attachment of the wishbone 34 to a subframe 40, which is provided via the adjustment device 50. In this case, the subframe 40 has two longitudinal members 42 extending in the longitudinal direction of the vehicle X, which are connected to one another via two cross members 44 extending in the transverse direction of the vehicle Y. The direction of travel is indicated by F. A plurality of bearing holders 46, 52 are arranged laterally on the subframe 40 for attaching wheel guide elements, of which only one wishbone 34 is shown.

The adjustment device 50 according to the invention is arranged in an attachment region of the subframe 40, which is difficult to observe and/or access due to limited installation space. The bearing 11 of the adjustment device 50 is fastened to the double shear bearing holder 52 of the subframe 40 via a screw connection by means of a bearing pin 24. By turning the bearing pin 24, the distance between the subframe 40 and the wishbone 34 can be easily adjusted in the transverse direction Y of the vehicle, for example in order to change wheel position variables such as the toe and/or the camber.

The use of the adjustment device 50 is not limited to wheel suspensions. It can also be used for mounting an assembly on the subframe 40, for example.

Figure 5:
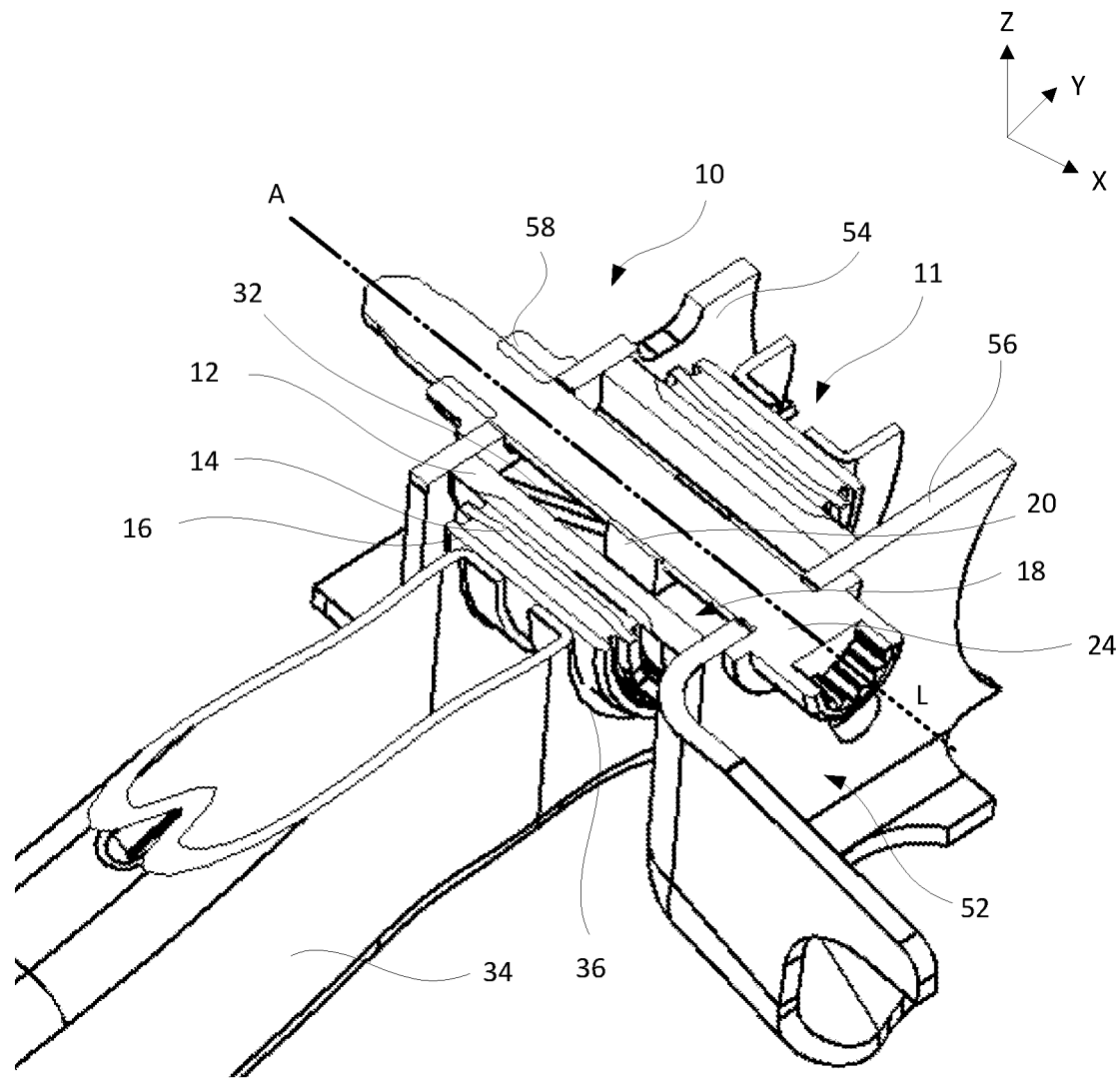
FIG. 5 shows a sectional view of an adjustment device according to the invention with a spacing element in the center position.

FIG. 5 shows a cross-section of the adjustment device 50 according to FIG. 3 along the attachment axis A in an oblique view from above. The adjustment device 50 comprises an adjustment unit 10, which comprises a bearing 11 that is received in a bearing receptacle 36 of the wishbone 34. The bearing receptacle 36 is embraced by a double shear bearing holder 52 having two bearing brackets 54, 56. The bearing 11 and the bearing brackets 54, 56 are penetrated by a bearing pin 24 which is formed, for example, with a partial thread and which is fixed in the bearing holder 52 by a nut 58. The bearing pin 24 is adjacent to an attachment axis A of the bearing 11.

The inner core 12 of the bearing 11 is presently formed with a substantially rectangular passage 18. In the passage 18, a guide rail 32 designed in particular as a groove is arranged on the inner core 12. The guide rail 32 extends in the longitudinal direction of the passage 18, wherein the guide rail 32 extends at an angle relative to the bearing axis L and thus to the attachment axis A. That is, the guide rail 32 has an inclination relative to the bearing axis L as well as the attachment axis A.

A presently cube-shaped spacing element 20 is guided in the guide rail 32 by means of at least one guide element 30. For example, a guide element 30 in the form of a guide pin 30 is arranged on the spacing element 20 and is guided in the guide rail 32.

The spacing element 20 has an opening 22 in which the bearing pin 24 is received. The spacing element 20 is shown in a central position in the axial longitudinal direction of the bearing 11. In the present case, the bearing axis L and the attachment axis A overlap. The opening 22 is formed with an internal thread, not shown herein, which engages an external thread of the bearing pin 24. The bearing pin 24 is screwed into the internal thread, wherein rotation of the bearing pin 24 causes the spacing element 20 to move axially along the bearing pin 24. The nut 58 of the bearing pin 24 is presently not yet tightened. Due to the positive guidance of the spacing element 20 along the bearing pin 24, the guide element 30 displaces the inner core 12 over an adjustment travel transverse to the attachment axis. That is, the inner core 12 and thus the entire bearing 11 are displaceable transversely to the bearing pin 24. As soon as the desired adjustment travel of the bearing 11 and thus of the wishbone relative to the subframe, not shown, is reached, the nut 58 of the bearing pin 24 is tightened. Thus, the force flow again runs through the end faces of the inner core 12.

Figure 6:
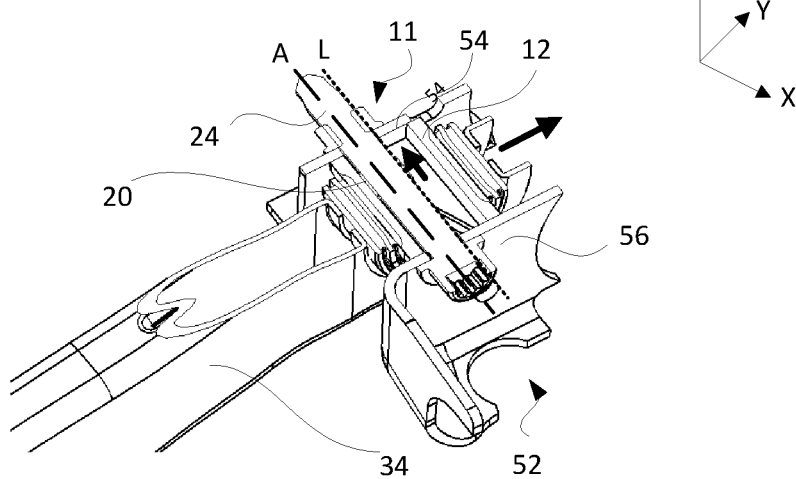
FIG. 6 shows a sectional view of an adjustment device according to the invention with a deflected spacing element.
Figure 7:
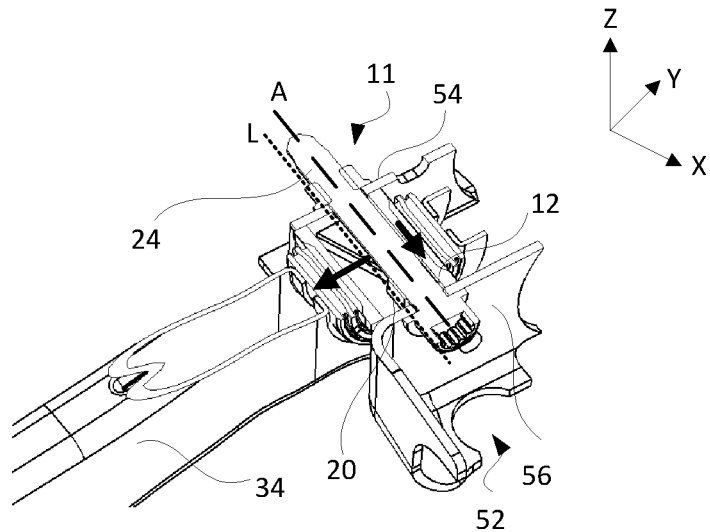
FIG. 7 shows a sectional view of an adjustment device according to the invention with a deflected spacing element.

FIG. 6 and FIG. 7 each show the adjustment device 50 according to FIG. 5, wherein the spacing element 20 is arranged in differently deflected positions along the bearing pin 24. The adjustment device 50 shown is provided in particular for camber or toe correction. When the bearing pin 24 is rotated, the positive guidance of the spacing element 20 along the bearing pin 24 and an interaction of the guide element 30, not shown, with the guide rail 32, results in a displacement of the inner core 12 of the bearing 11 transversely to the bearing pin 24 or attachment axis A. The displacement of the inner core 12 changes the relative position of the inner core 12 and of the entire bearing 11 with respect to the attachment axis A, which is adjacent to the bearing pin 24. This changes the position of the control arm 42 relative to the bearing brackets 54, 56 of the bearing holder 52, which is arranged on a subframe 40, for example.

Due to the geometric design of the guide rail 32, the displacement of the control arm 34 can be adjusted as a function of the position of the spacing element 20 along the bearing pin 24, successively as a function of the number of rotations of the bearing pin 24, so that the control arm 24 approaching a respective end stop can be easily detected.

A distance between the control arm 34 and the subframe 40, presently not shown, can be adjusted in the described manner by rotating the bearing pin 24. Thus, in FIG. 6, a distance between the control arm and the subframe 40, presently not shown, is reduced by deflecting the spacing element 20 in one direction, whereas in FIG. 7, the distance between the control arm 34 and the subframe 40 is increased by deflecting the spacing element 20 in the respective other direction.

The invention claimed is:

1. An adjustment unit comprising: a bearing having an inner core formed with a passage extending in a longitudinal direction of the inner core and having a cylindrical outer sleeve defining an outer portion of the bearing and surrounding the inner core, wherein a spacing element is disposed in the passage and has an opening for receiving a bearing pin, wherein the opening extends along a longitudinal axis, which defines an attachment axis of the bearing, and wherein the attachment axis and the bearing axis are adjustable relative to one another by an adjustment of the spacing element, wherein the spacing element is movably arranged in a direction of extension of the passage, wherein, in an installed state of the bearing, the spacing element is axially adjusted along the attachment axis and causes a translational deflection of the inner core transversely to the attachment axis.

2. The adjustment unit according to claim 1, wherein the spacing element is arranged non-rotatably in the inner core.

3. The adjustment unit according to claim 2, the passage of the inner core has a longitudinal axis extending at an angle to the bearing axis.

4. The adjustment unit according to claim 2, wherein the spacing element is displaceable along at least one guide rail arranged on the inner core, wherein the guide rail extends at an angle relative to the bearing axis in the longitudinal direction of the passage.

5. The adjustment unit according to claim 2, wherein the spacing element is formed with an internal thread.

6. The adjustment unit according to claim 1, the passage of the inner core has a longitudinal axis extending at an angle to the bearing axis.

7. The adjustment unit according to claim 6, wherein the spacing element is formed with an internal thread.

8. The adjustment unit according to claim 1, wherein the spacing element is displaceable along at least one guide rail arranged on the inner core, wherein the guide rail extends at an angle relative to the bearing axis in the longitudinal direction of the passage.

9. The adjustment unit according to claim 8, wherein the spacing element has at least one guide element, which is received in the guide rail.

10. The adjustment unit according to claim 8, wherein the spacing element is formed with an internal thread.

11. The adjustment unit according to claim 9, wherein the spacing element is formed with an internal thread.

12. The adjustment unit according to claim 1, wherein the spacing element is formed with an internal thread.

13. An adjustment device for adjusting a relative position of two components supported against one another, comprising:
   an adjustment unit comprising: a bearing having an inner core formed with a passage extending in a longitudinal direction of the inner core and having a cylindrical outer sleeve defining an outer portion of the bearing and surrounding the inner core, wherein a spacing element is disposed in the passage and has an opening for receiving a bearing pin, wherein the opening extends along a longitudinal axis, which defines an attachment axis of the bearing, wherein the attachment axis and a bearing axis are provided in a plane, and wherein the attachment axis and the bearing axis are adjustable relative to one another by an adjustment of the spacing element, wherein the spacing element is movably arranged in a direction of extension of the passage, wherein, in an installed state of the bearing, the spacing element is axially adjusted along the attachment axis and causes a translational deflection of the inner core transversely to the attachment axis; and
   a bearing receptacle provided in a first of the two components, wherein the bearing is received in the bearing receptacle, wherein the bearing receptacle is embraced by a bearing holder arranged on a second of the two components, and wherein the bearing, the spacing element and the bearing holder are penetrated by a bearing pin which can be fixed to the bearing holder by means of a screwable nut.

14. The adjustment device according to claim 13, wherein the bearing pin is in operative connection with the inner core via the spacing element in order to deflect the inner core over an adjustment travel transverse to the attachment axis.

15. The adjustment device according to claim 14, wherein the adjustment travel can be adjusted as a function of an axial travel distance of the spacing element.

16. The adjustment device according to claim 14, wherein the adjustment travel can be adjusted as a function of a number of rotations of the bearing pin.

* * * * *